(12) United States Patent
Brady

(10) Patent No.: US 6,417,251 B1
(45) Date of Patent: Jul. 9, 2002

(54) ULTRAFILTRATION PROCESSES FOR THE RECOVERY OF POLYMERIC LATICES FROM WHITEWATER

(75) Inventor: Robert Anthony Brady, Lower Makefield, PA (US)

(73) Assignee: Rohm and Haas Company, Phila, PA (US)

( * ) Notice: Subject to any disclaimer, the term of this patent is extended or adjusted under 35 U.S.C. 154(b) by 76 days.

(21) Appl. No.: 09/589,590

(22) Filed: Jun. 8, 2000

Related U.S. Application Data

(60) Provisional application No. 60/140,139, filed on Jun. 21, 1999.

(51) Int. Cl.[7] .............................................. B01D 21/24
(52) U.S. Cl. ......................................... 523/310; 521/40
(58) Field of Search ........................... 521/40, 45, 45.5; 523/309, 310, 332

(56) References Cited

U.S. PATENT DOCUMENTS

| | | | |
|---|---|---|---|
| 4,952,317 A | 8/1990 | Culkin | |
| 5,171,767 A | 12/1992 | Buckley et al. | |
| 5,242,596 A | 9/1993 | Bachem et al. | |
| 5,492,626 A | * 2/1996 | Uenoyama et al. | 210/651 |
| 6,248,809 B1 | * 6/2001 | Buckley et al. | 523/310 |

OTHER PUBLICATIONS

"New Separation System Extends the Use of Membranes." Filtration & Separation, Sep./Oct. 1992, pp. 376–378.

* cited by examiner

*Primary Examiner*—Edward J. Cain
*Assistant Examiner*—Katarzyna W. Lee

(57) ABSTRACT

This invention relates to a process for the recovery of polymeric latices from whitewater. The process of the invention is an ultrafiltration process which utilizes a flat membrane run in the turbulent regime, or a vibrating membrane.

9 Claims, No Drawings

ULTRAFILTRATION PROCESSES FOR THE RECOVERY OF POLYMERIC LATICES FROM WHITEWATER

This application claims priority from provisional application No. 60/140,139, filed Jun. 21, 1999.

This invention relates to ultrafiltration processes for the recovery of polymeric latices from whitewater. In particular, the invention relates to an ultrafiltration process which utilizes a flat membrane run in the turbulent regime, or a vibrating membrane.

Polymer latices, also termed polymer emulsions, are widely used in industrial applications, including binders for paints, printing inks, non-woven fabrics and the like. These latices may be prepared in continuous or batch processes by polymerizing monomers, usually ethylenically unsaturated compounds, in the presence of water, surfactants and other adjuvants that affect the manufacturing process or the properties of the latices.

Economics may dictate that the same kettles, piping and other equipment be used to produce different latices, therefore the equipment must be cleaned between batches. Even where a single latex is produced on a continuous basis, the equipment must still be cleaned periodically.

Cleaning usually comprises washing the equipment with water. This creates large volumes of dilute aqueous latex known as "whitewater". Whitewater thus created may have a solids concentration of about 5% by weight or less, although it may be higher. This solids concentration represents emulsion-sized particles of the original polymer latex. In addition to these particles of the original polymer latex, whitewater may also contain alcohols or other organic liquids, surfactants and the like. As produced, the solids concentration of the whitewater emulsion is far below the typical 40% or greater found in the original polymer latex, but it represents enough suspended organic matter to cause a serious waste disposal problem.

Typical whitewater may contain emulsion-sized particles of polymers such as styrenics, acrylics such as polymers of esters of acrylic or methacrylic acid, acrylonitrile, vinyl polymers such as poly(vinyl chloride) and vinyl acetate, and complex copolymers of two or more such materials, with crosslinkers, graftlinkers and the like, such as butadiene, divinylbenzene, ethylene glycol dimethacrylate, allyl methacrylate and the like.

In typical manufacturing operations, whitewater generated by various batches of different polymer types throughout a plant are combined, the entire mixture is treated as a single waste stream, and then the mixture is disposed of, generally by incineration. This represents a financial loss for the manufacturer, both by a decrease in yield with some latex product going to waste, and then having to dispose of the whitewater waste stream generally by incineration.

In order to address the cost issues, U.S. Pat. No. 5,171,767 described an ultrafiltration process and apparatus for polymeric latices, whereby the polymer obtained from the whitewater could be recycled into good product. The patent was directed towards the use of hollow fiber membranes in polymeric latex whitewater ultrafiltration operations. The patent further taught that the polymer latex will be unstable under turbulent flow, and therefore laminar flow (a Reynolds number of 3000 or lower) is required in the process.

Ultrafiltration systems may utilize many different configurations, including hollow fiber membranes, tubes, sheets, spiral, or flat membranes. Ultrafiltration membranes have "semi-permeable" walls. As used herein, by semi-permeable is meant that low molecular weight materials such as water, surfactant, and salt pass through, but high molecular weight materials such as polymer do not pass through.

Ultrafiltration flat membranes are an assembly of sheets of membrane material stacked and bound to form a "cassette". Whitewater enters an inlet manifold on the cassette and passes across the parallel membrane surfaces. As the material passes across the membrane surfaces, non-polymer containing material permeates the membrane and passes behind the membrane surfaces, then exits the cassette through a separate "clean" water manifold.

The ultrafiltration process generates a concentrated whitewater stream which contains polymer, and a non-polymer containing stream, known as the permeate. Generally, the concentration of polymer in the concentrated whitewater stream does not exceed 40% by weight. The permeate may contain surfactants, salts, and small organic compounds.

There are several problems associated with the use of hollow fiber membranes in polymeric latex whitewater ultrafiltration operations:

1) the hollow fibers have been prone to breakage;
2) the hollow fibers are more expensive than a flat membrane;
3) the hollow fibers build a non-permeable layer on the membrane which is known as "fouling"; and
4) the hollow fibers do not have as long of a life as a flat membrane.

Flat membranes are known to be utilized in polymeric latex whitewater ultrafiltration operations. It is well documented that flat membranes should be run in the laminar flow regime to avoid problems with the stability of the polymer latex. However, the flat membranes tend to foul under these operating conditions.

Therefore, there is a need for a process for the recovery of polymeric latices from whitewater, which provides longer membrane life. It would also be useful if the process could provide a higher concentration of polymer recovered from the whitewater.

The present inventor has now discovered that with the ultrafiltration systems described herein, it is possible to provide a process for the recovery of polymeric latices from whitewater, which provides longer membrane life through reduced fouling of the membrane. The inventor has also provided a process which can provide a concentration of polymer recovered from the whitewater as high as 60% by weight.

In one aspect of the present invention, there is provided a process for recovering a polymer latex product from a whitewater emulsion which includes a) contacting the whitewater emulsion with a stationary ultrafiltration flat membrane; b) removing water and other low molecular weight material from the whitewater emulsion; and c) recirculating the whitewater emulsion across the ultrafiltration flat membrane repeatedly to generate a concentrated whitewater emulsion having a polymer concentration greater than the initial polymer concentration of the whitewater emulsion; wherein the whitewater emulsion flows through the ultrafiltration flat membrane in turbulent flow.

In a second aspect of the present invention, there is provided a process for recovering a polymer product from a whitewater emulsion which includes contacting the whitewater emulsion with a vibrating ultrafiltration membrane to remove water and other low molecular weight materials from the whitewater emulsion to generate a concentrated whitewater emulsion having a polymer concentration greater than the initial polymer concentration of the whitewater emulsion.

The process of the invention may be useful for whitewater containing any polymer. Suitable polymers include, but are not limited to styrenics; acrylics such as polymers of esters of acrylic or methacrylic acid; acrylonitrile; vinyl polymers such as poly(vinyl chloride) and vinyl acetate; and complex copolymers of two or more such materials, with crosslinkers, graftlinkers and the like, such as butadiene, divinylbenzene, ethylene glycol dimethacrylate, allyl methacrylate and the like. Acrylic latex polymers are preferred. The concentration of polymer in the whitewater is not critical, but typically is 10 percent by weight or less, more typically 5 percent by weight or less.

In one embodiment of the invention, the whitewater emulsion is contacted with an ultrafiltration flat membrane. The structure of ultrafiltration flat membranes is described above. The channel height is the height between flat membranes. For the flat membranes useful in this invention, the channel height may be from 25 to 75 mil, preferably from 30 to 50 mil. The transmembrane pressure is the pressure across the membrane wall. Transmembrane pressures typically range from 70 to 1400 kiloPascals (kPa), more typically from 70 to 300 kPa for the stationary membranes and 300 to 1400 kPa for the vibrating membranes. The operating temperature for an ultrafiltration process typically ranges from 0° C. to 60° C., more typically from 10° C. to 50° C., most typically from 30° C. to 50° C. The operating pressure is typically from 50 kPa to 1400 kPa, more typically from 100 kPa to 400 kPa for the stationary membranes and 300 to 1400 kPa for the vibrating membranes.

The flat membrane is semi-permeable and may be made of various materials. Suitable materials include, but are not limited to inorganic membranes such as ceramic membranes, as well as composite materials in which a ceramic membrane is supported by an organic material, or an organic membrane is supported by an inorganic material. Preferably, the flat membrane is made from synthetic or natural polymeric materials. These include membranes in which the porous support structure is integral to the membrane layer, and those in which the membrane layer is cast or otherwise layered onto the porous support structure. Particularly useful are those synthetic polymeric materials which may be cast, spun, or extruded into semi-permeable membranes, and which are temperature resistant and solvent resistant.

Other suitable membrane materials include, but are not limited to polyamides such as nylon and aromatic polyamides; polyphenylene oxides; polyvinylidene fluoride; olefinic resins, such as polypropylene, polyethylene and the like; sulfones such as polysulfone, polyethersulfone and the like; cellulosics such as cellulose acetate, cellulose nitrate, mixed cellulose acetate-nitrate and the like; sulfonated polymers such as sulfonated polysulfone, sulfonated polyethersulfone and the like. Copolymers made by polymerizing two or more monomers are also among suitable flat membrane materials, as for example copolymers made by copolymerizing acrylonitrile, methacrylonitrile and other ethylenically unsaturated dienes such as isoprene and butadiene, and various acrylates, such as acrylates, methacrylates and other acrylic resins such as the esters of acrylic and methacrylic acids, as for example methyl, ethyl, butyl, isopropyl, and hexyl acrylates and methacrylates.

In a preferred embodiment of the invention, the flat membrane is stationary, meaning that the membrane does not vibrate through the use of mechanical means. As was discussed above, flat membranes tend to foul. It has previously been taught that in order to obtain the longest life from flat membranes, the flow of liquid through the membrane should be laminar, for example a Reynolds number of 3000 or less. The present inventor has discovered that the use of turbulent flow in the process of whitewater polymer emulsion ultrafiltration reduces fouling, thereby providing a longer life for the flat membrane. The flow of whitewater emulsion through the ultrafiltration flat membrane is preferably at a Reynolds number of greater than 3000, more preferably, greater than 4000, most preferably from 4000 to 50000.

In another embodiment of the invention, the membrane is a vibrating membrane. The vibrating membrane may have many different configurations, including hollow fiber membranes, tubes, sheets, spiral, or flat membranes. Flat membranes are preferred. The membrane may be made of the same materials described above. The vibrating membrane may vibrate at a rate of from 20 to 100 Hz, preferably from 40 to 70 Hz. Suitable vibrating membranes are available as V*SEP® instruments through New Logic International. The vibrating flat membrane technology is not as susceptible to fouling as stationary membranes. Therefore, the flow of whitewater emulsion through the vibrating flat membrane may be laminar or turbulent.

The ultrafiltration membrane allows water and other low molecular weight materials, such as salts and surfactants to pass through the membrane, thereby concentrating the polymer in the whitewater emulsion. The whitewater emulsion may be passed through the ultrafiltration membrane once, or may be recirculated across the flat membrane repeatedly to generate a concentrated whitewater emulsion having a polymer concentration greater than the initial polymer concentration in the whitewater emulsion. Preferably, the concentrated whitewater emulsion has a polymer solids content of at least 10 weight percent. With the stationary flat membrane technology, the concentration of polymer in the concentrated whitewater emulsion may reach 40 percent by weight. With the vibrating membrane technology, the concentration of polymer in the concentrated whitewater emulsion may reach up to 60 percent by weight.

The concentrated whitewater emulsion will have a polymer concentration greater than the initial polymer concentration in the whitewater emulsion. The concentrated whitewater emulsion may contain from 10 percent by weight to 60 percent by weight polymer. The concentrated whitewater emulsion may be sold as product, recycled into the manufacturing process, or disposed of at reduced disposal cost.

The permeate from the ultrafiltration process is mostly water. The permeate may be discharged to a chemical treatment facility. Preferably, the permeate is utilized to dilute other products, to cool other reactions, or to rinse reactors, thereby providing a waste free process.

Throughout this specification and claims, unless otherwise indicated, references to percentages are by weight percent and all temperatures are in degree centigrade.

It is also to be understood that for purposes of this specification and claims that the range and ratio limits, recited herein, are combinable. For example, if ranges of 1–20 and 5–15 are recited for a particular parameter, it is understood that ranges of 1–15 or 5–20 are also contemplated.

The following Examples are provided as an illustration of the present invention.

For these examples, the flux (permeation rate per membrane area) was calculated and normalized to 25° C. as is common practice. As is typical for ultrafiltration systems, flux rate was observed to decline as the solids concentration in the retentate increased. As a benchmark, flux rates at 2% solids were compared for each run to determine the degree of membrane fouling. Declining flux rates with time are indicative of fouling. What is important for these systems, and is the object of this invention, is that the benchmark flux rates do not decline with operation time, or number of batches run. Declining flux rates limit system capacity and require the user to replace the expensive membrane cartridges, resulting in unacceptably high operating costs for the system.

EXAMPLE 1

Stationary Flat Membrane

Whitewater was collected and concentrated using a flat membrane ultrafiltration system. The system was fitted with ten flat membrane cassettes, each having approximately 2.8 $m^2$ of membrane area. Five of the membranes were of polyethersulfone material, and five were of polyvinylidene fluoride material.

Starting at concentrations ranging from 1% to 3.5%, the whitewater was fed from an agitated 50 $m^3$ feed tank, through a 200 micron bag filter, via a variable speed centrifugal pump. The feed pump was controlled to deliver the feed material at 100 kPa pressure into the circulation loop piping. Another variable speed centrifugal pump circulated the material at an initial rate of 250 $m^3$/hr, corresponding to a Reynolds number of 4000 through the membrane channels, indicative of turbulent flow, through the piping loop, across 10 flat membrane cassettes, and back. The speed of the recirculation pump was controlled so that the inlet pressure to the membranes was 250 kPa. Thus, with the combination of the feed pump set to deliver 100 kPa and the recirculation pump set to deliver 250 kPa, the pressure drop across the membranes, in the direction of recirculating flow, was maintained at 150 kPa over the course of the concentration process. The pressure on the permeate side of the membranes was maintained at 0.0 kPa throughout the run.

As the material passed across the membranes, water free of latex permeated through the membranes with concentrated whitewater resulting in the retentate recirculation loop. A portion of the recirculating stream was returned to the feed tank in order to prevent the recirculating material from heating excessively. Material in the feed tank at the start of a batch concentration was at ambient temperatures, 21–25° C. At the conclusion of the batch, material in the feed tank was at temperatures between 31–38° C. The flow rate of the stream bled off from the recirculation loop was maintained at a nominal value of about 300 liters/minute, ten times the initial total permeate rate. The volume of the white water lost through the combination of permeation and bleed flow was made up by the feed stream.

Nine batches of white water were concentrated in the manner described. The duration of each batch was typically 20 hours, or less. At the conclusion of each batch, the system was drained, rinsed, and cleaned with a hot water and soap solution.

Samples of the feed stream were taken and measured for solids periodically during each batch. The rate of permeation was recorded at the time of each sample. The results of those batches are shown in Table 1.

EXAMPLE 2 (COMPARATIVE)

The above Example was repeated with the same operating conditions, but with sixteen polyethersulfone membrane cassettes installed so that the same recirculation flow rate yielded Reynolds numbers of 2700 or lower (laminar flow). Only six batches were run due to severe membrane fouling.

The results of these runs are shown in Table 1.

TABLE 1

| Batch | Permeate Flux (liters/$m^2$-hr @ 25° C.) | |
|---|---|---|
| | Example 1 | Example 2 |
| 1 | 90 | 90 |
| 2 | 87 | 49 |
| 3 | 80 | 49 |
| 4 | 70 | 33 |
| 5 | 80 | 43 |
| 6 | 76 | 35 |
| 7 | 75 | NR |
| 8 | 73 | NR |
| 9 | 82 | NR |

NR = not run due to extreme fouling

From the data, it can be seen that after an initial decline, which is typical for ultrafiltration membranes, the benchmark flux rates remained stable within 15% of the mean when the process was run in the turbulent flow regime. Operating this same system at conditions corresponding to Reynolds numbers at below 2700 (indicative of laminar flow), typically yielded flux rate declines greater than 50%, over the course of fewer batches. In fact, membrane fouling was so severe that 9 consecutive batches could not be completed.

EXAMPLE 3

To confirm the viability of vibrating membrane ultrafiltration ("VMUF") technology for the concentration of acrylic latices, a sample was prepared and concentrated in a VMUF unit.

The VMUF unit was a V*SEP® instrument obtained through New Logic International and was installed with 1.53 $m^2$ of polyethersulfone membrane area. A sample was prepared comprising a mixture of three polymers, polymer A, polymer B and polymer C. The mixture was prepared by diluting the polymers with water to 2.03% solids and then combining them in equal parts, by volume. This mixture was then transferred to a feed tank. From the feed tank, the material was pumped via an electrically driven diaphragm pump, through a 20 mesh Y strainer, into the vibrating membrane ultrafiltration system. The output pressure from the feed pump was maintained at between 650 kPa and 1100 kPa and the rate of feed was nominally 4000 mL/min. As the sample passed over the vibrating membranes, it was concentrated. The permeate was observed to be free of turbidity. The concentrated material then exited the membrane pack, its flow being controlled by an automated valve. After passing through the valve, the material was returned to the feed tank, where it was recycled through the system until the concentration in the feed tank was 20.91% solids. At that point, the material was further concentrated from 20.91% solids to 40.8% solids in a single pass through the membrane filter pack, and was collected in a separate container. The concentrated material was analyzed for stability and particulate. The results indicated that the concentrated material was suitable for sale or recycle into production.

I claim:

1. A process for recovering a polymer latex product from a whitewater emulsion comprising:
   a) contacting the whitewater emulsion with a stationary ultrafiltration flat membrane;
   b) removing water from the whitewater emulsion; and
   c) recirculating the whitewater emulsion across the ultrafiltration flat membrane repeatedly to generate a concentrated whitewater emulsion having a polymer concentration greater than the initial polymer concentration of the whitewater emulsion;

wherein the whitewater emulsion flows through the ultrafiltration flat membrane in turbulent flow.

2. The process according to claim 1 wherein the flat membrane is made from a material selected from the group consisting of natural and synthetic polymers.

3. The process according to claim 2 wherein the whitewater emulsion flows through the ultrafiltration flat membrane at a Reynolds number of greater than 4000.

4. The process according to claim 3 wherein the polymer latex product is an acrylic latex polymer.

5. The process according to claim 1 wherein the concentrated whitewater emulsion is utilized by a method selected from the group consisting of selling the concentrated whitewater emulsion as product, recycling the concentrated whitewater emulsion into the manufacturing process, and disposing of the concentrated whitewater emulsion at reduced disposal cost.

6. The process according to claim 1 wherein the water removed from the whitewater emulsion is used in a manner selected from the group consisting of cooling other reactions and rinsing reactors.

7. A process for recovering a polymer product from a whitewater emulsion comprising:

contacting the whitewater emulsion with a vibrating ultrafiltration membrane to remove water from the emulsion to generate a concentrated whitewater emulsion having a polymer concentration greater than the initial polymer concentration of the whitewater emulsion; wherein said polymer product is an acrylic latex polymer and wherein the membrane vibrates at a rate of 20–100 Hz.

8. The process according to claim 2 wherein the flat membrane is made from a material selected from the group consisting of natural and synthetic polymers.

9. The process according to claim 2 wherein the concentrated whitewater emulsion is utilized by a method selected from the group consisting of selling the concentrated whitewater emulsion as product, recycling the concentrated whitewater emulsion into the manufacturing process, and disposing of the concentrated whitewater emulsion at reduced disposal cost.

* * * * *